H. S. HUBBELL.
CHUCK.
APPLICATION FILED MAR. 27, 1919.
1,338,775. Patented May 4, 1920.
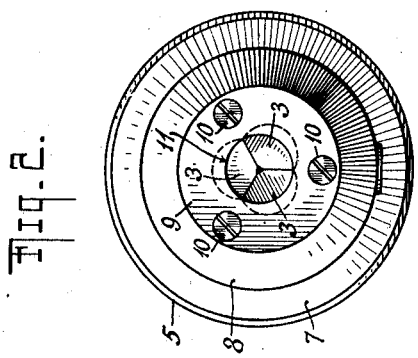
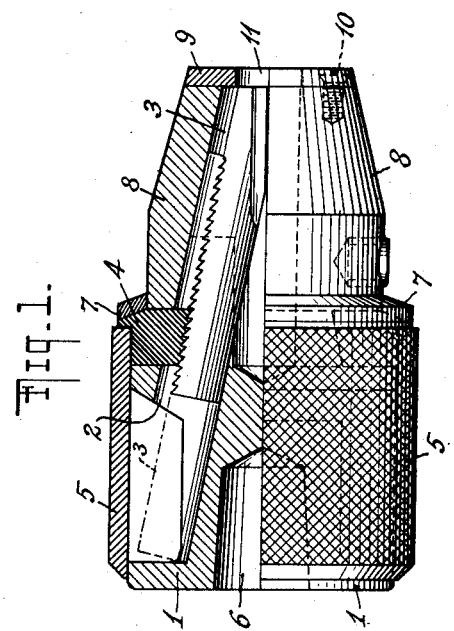
WITNESSES
INVENTOR
HENRY S. HUBBELL
BY
ATTORNEYS

UNITED STATES PATENT OFFICE.

HENRY S. HUBBELL, OF ASHBURNHAM, MASSACHUSETTS.

CHUCK.

1,338,775.　　　　Specification of Letters Patent.　　　Patented May 4, 1920.

Application filed March 27, 1919. Serial No. 285,574.

*To all whom it may concern:*

Be it known that I, HENRY S. HUBBELL, a citizen of the United States, and a resident of Ashburnham, Worcester county, State of Massachusetts, have invented certain new and useful Improvements in Chucks, of which the following is a specification.

This invention relates more particularly to drill chucks of the three jaw type, the improvements being more fully described in the specification. Heretofore the three jaw drill chuck has been recognized as the best, most accurate and most efficient form of drill chuck, and for stationary machines this is still true. When, however, the chuck is exposed to rough usage and handling, as in the case of portable electric drills which are very largely used as hand drills, the three jaw chuck has developed disadvantages which have caused it to be replaced by the far less efficient and less accurate and less satisfactory two jaw chuck.

The object of the present invention is to reconstruct the three jaw chuck in such a way as to avoid all of its apparent defects so that it may be restored to the art, particularly in connection with hand drills, as a chuck embodying every advantage of the three jaw chuck while avoiding the disadvantages which have caused its displacement by the two jaw chuck.

The invention is illustrated in the accompanying drawings in which Figure 1 represents a side view of the chuck partly in section, partly in elevation, while Fig. 2 represents a front view. The chuck illustrated in the drawing comprises the usual components of the standard three jaw chuck, to wit: the body 1 provided with the three axially inclined jaw recesses 2, the sliding jaws 3 provided with exterior threads, the threaded nut 4, the sleeve 5 and a drill socket 6, Teeth 7 are shown as forming an integral part of the nut 4 although for the purposes of the present invention said teeth may form part of the sleeve 5 or be omitted altogether. The sleeve 5 is rigidly attached to the nut 4 and the operation of such a chuck, as is well understood, is that as movement is imparted to the nut 4 the jaws 3 will be moved outwardly or inwardly according to the movement of the nut.

The novel feature of the chuck, as illustrated, consists in a development of the forward part of the chuck, to wit, that part of the body 1 which is designated as 8 being carried outwardly to a point approximately corresponding to the plane defined by the forward faces of the jaws in their outermost position. Heretofore three jaw drill chucks have been made on the opposite principle, to wit, that the development of the part 8 of the body 1 has only been carried outwardly to a point corresponding to the forward faces of the jaws in their most retracted position. The result of this former method of construction was that in the operation of the chuck in gripping the tool the jaws projected out of the body of the chuck to a greater or less extent. This circumstance, of course, brought about a difference in the extent to which the rounded outer part of the jaws 3 found a bearing against the inner wall of the body 8 according as the tool employed was of greater or less diameter. With the rough handling of such chucks and the fact that the projecting jaws were the elements which received the most violent shocks, this unevenness of relative area of bearing surface and, consequently of effective distribution of lubricants in the chuck, together with the fact that the jaws themselves were directly exposed to destructive influences, brought about a condition which required correction. By developing the forward part of the body of the chuck in the manner shown in the drawing and bringing it to the position shown, it will be obvious that no matter what the position of the jaws may be or what the size of the tool may be, the jaws are equally supported at all gripping diameters and the same area of surface is provided to retain the lubricant for the jaws under the pressure of gripping quite independent of the size of the tool, for no matter whether the jaws are in the foremost position, as shown in the drawing, or in the most retracted position indicated by the dotted lines, the support for the gripping jaws is always exactly the same instead of, as heretofore, having a portion of the forward parts of the jaw at all times outside of the body of the chuck and unsupported thereby.

The improved structure shown in the drawings has the additional merit of protecting the jaws against injury by making it impossible for the jaws to come into contact with the work. This protection can be increased by the use of a protecting plate 9 fastened to the forward face of the body 8 by screws 10, the plate being centrally apertured as at 11, said aperture being smaller than the circle whose radius extends to the outer surface of the jaws when in their foremost position but approximately equal to the circle whose radius extends to the gripping faces of the jaws in their most retracted position. In other words, the aperture 11 is so dimensioned as not to interfere with the capacity of the chuck to receive the shank of a tool of any size which the chuck may be adapted to receive, the plate 9, however, acting as an abutment for the forward face of the jaws 3, protecting said jaws against injury.

The result of the foregoing modification of the construction of the standard chuck is to provide a somewhat increased weight of material, due to the forwardly developed body 8, nearer the forward point of the tool, which means that the center of gravity of the combined chuck and tool is moved nearer to the active edge of the latter.

Having thus described my invention, what I claim is:

1. A drill chuck comprising a body having a plurality of jaw recesses converging inwardly to the forward end of said body, jaws in said recesses movable lengthwise thereof and provided with threads and a nut rotatable on said body and held against axial movement relatively thereto, said nut being threaded to co-act with the threads on said jaws and to cause the latter to move forward and backward in said jaw recesses, the forward end face of the body and the forward ends of the recesses extending to a point approximately corresponding to the plane defined by the forward faces of the jaws when in their outermost position whereby no part of said jaws projects beyond said jaw recesses in any adjustment of the chuck.

2. A drill chuck comprising a body having a plurality of jaw recesses converging inwardly to the forward end of said body, jaws in said recesses movable lengthwise thereof and provided with threads, a nut rotatable on said body and held against axial movement relatively thereto, said nut being threaded to co-act with the threads on said jaws and to cause the latter to move forward and backward in said jaw recesses, the forward end face of the body and the forward ends of the recesses extending to a point approximately corresponding to the plane defined by the forward faces of the jaws when in their outermost position, whereby no part of said jaws projects beyond said jaw recesses in any adjustment of the chuck, and a plate attached to the forward end face of said body and apertured for the admission of a tool shank, said aperture being dimensioned to permit the insertion of a tool shank of any size for which the chuck is adapted.

In testimony whereof I have hereunto set my hand.

HENRY S. HUBBELL.